Nov. 27, 1951 M. COHEN 2,576,670
METHOD AND MEANS FOR CONTINUOUS DOUGH FEED
Filed Oct. 5, 1946 3 Sheets-Sheet 1
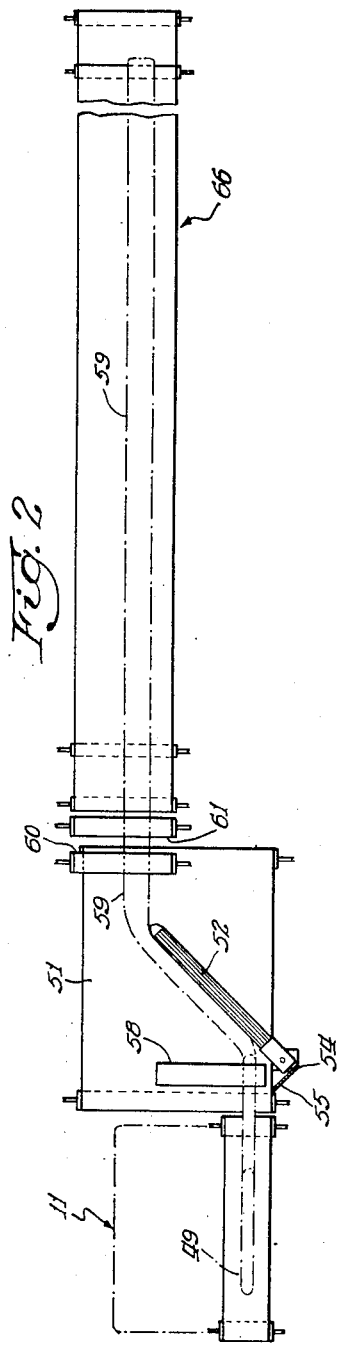
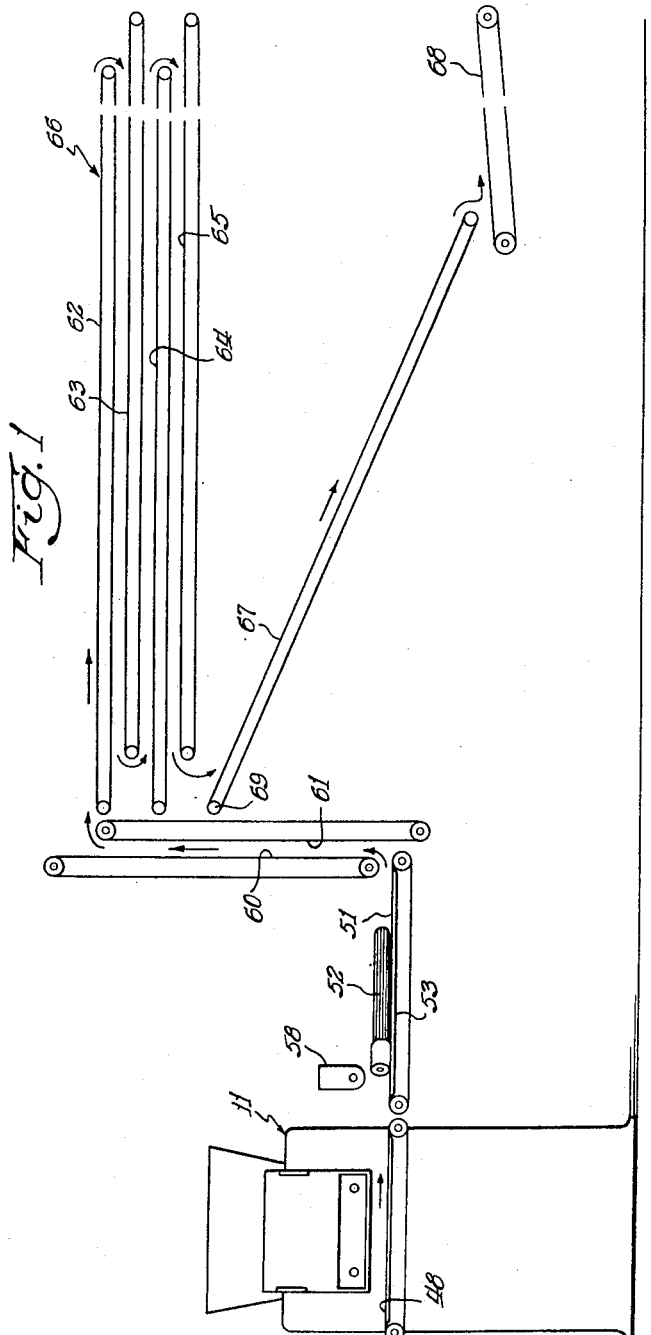
Inventor:
Morris Cohen
By: A. Trevor Jones
Atty.

Nov. 27, 1951 M. COHEN 2,576,670
METHOD AND MEANS FOR CONTINUOUS DOUGH FEED
Filed Oct. 5, 1946 3 Sheets-Sheet 2
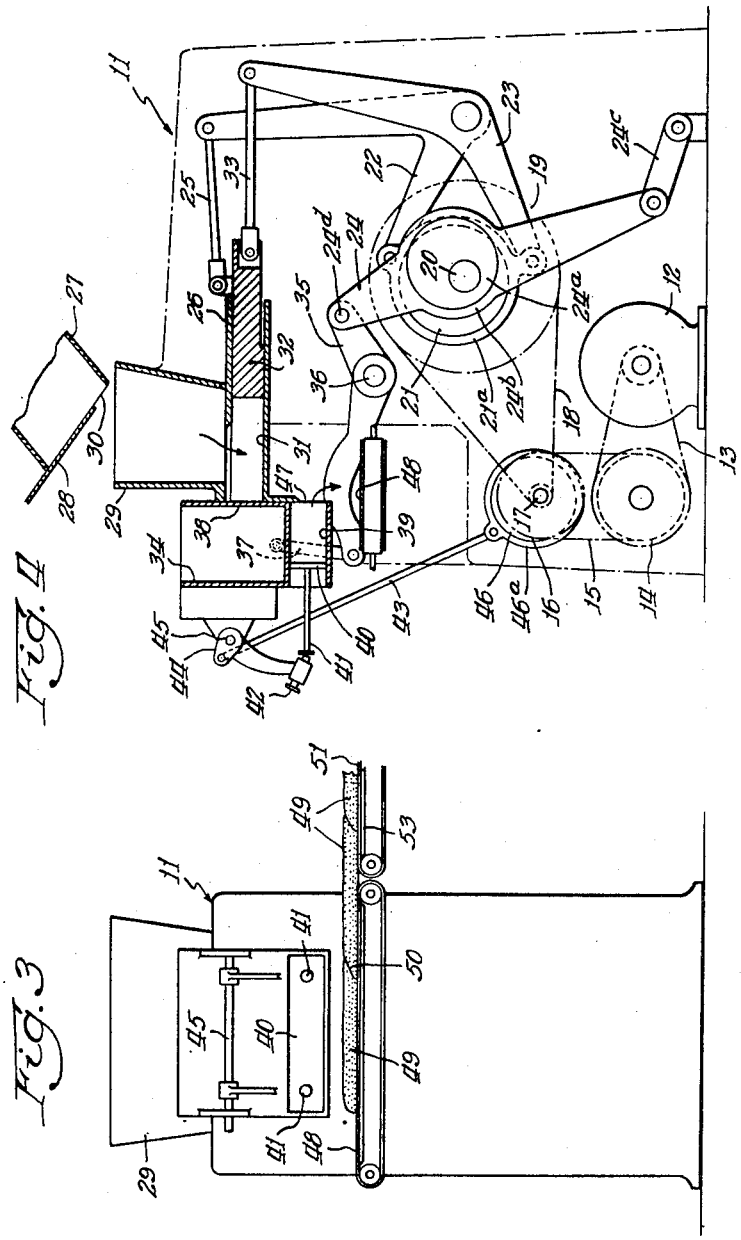
Inventor:
Morris Cohen
By: A. Trevor Jones
Atty.

Nov. 27, 1951 M. COHEN 2,576,670
METHOD AND MEANS FOR CONTINUOUS DOUGH FEED
Filed Oct. 5, 1946 3 Sheets-Sheet 3
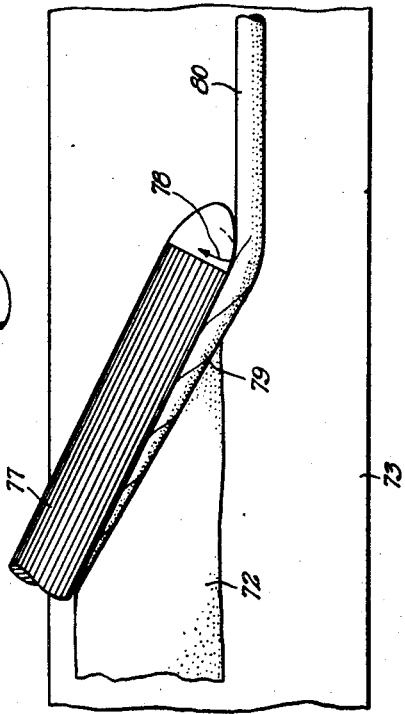
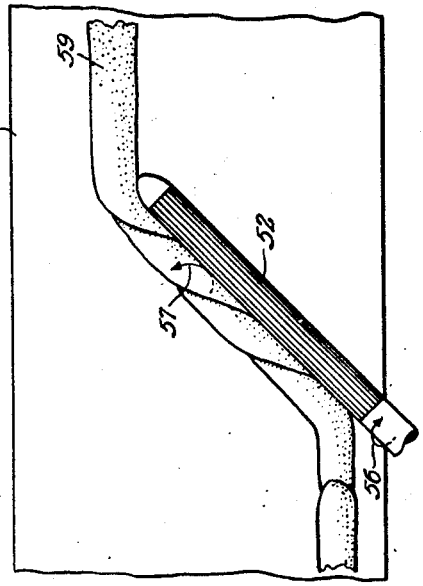
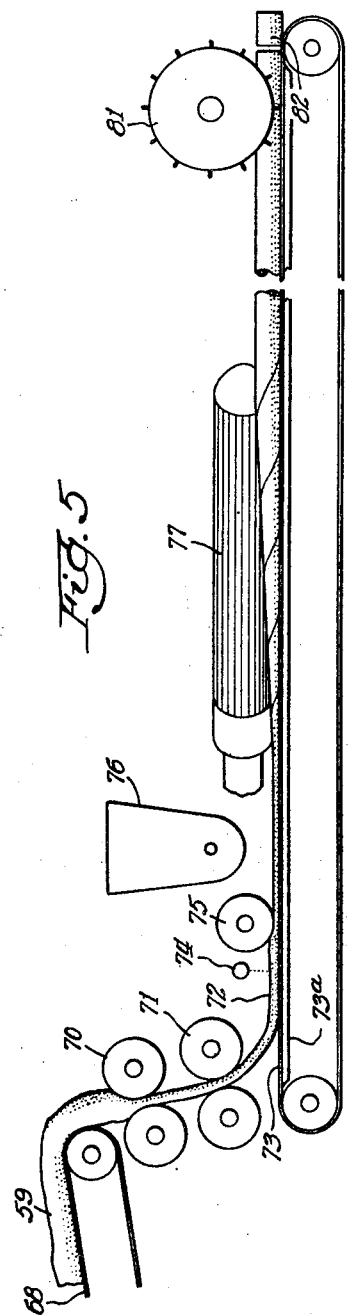
Inventor:
Morris Cohen
By A. Trevor Jones
Atty.

Patented Nov. 27, 1951

2,576,670

UNITED STATES PATENT OFFICE 2,576,670

METHOD AND MEANS FOR CONTINUOUS DOUGH FEED

Morris Cohen, Kansas City, Mo., assignor to Interstate Bakeries Corporation, Kansas City, Mo., a corporation of Delaware Application October 5, 1946, Serial No. 701,583

2 Claims. (Cl. 107—54)

This invention relates to method and means for continuous feeding and sheeting of dough in commercial bakery plants where savings in time and labor costs are important and where, together with such savings, improvements in the quality of the bread product are sought.

The present invention is of special utility in connection with the continuous production of cinnamon buns and the like in which the dough is formed into coils, for example, as shown in the Fonken reissue Patent No. 22,399, and in the Cohen et al. Patents Nos. 2,352,617 and 2,383,774.

According to those prior disclosures, the dough is formed into a long flat strip of indefinite length and of substantially uniform width and thickness and the dough strip is then coiled somewhat longitudinally by an oblique roller to form a continuously coiled cylinder of dough which is then cut off in longitudinal sections for making the individual cinnamon buns. One of the shortcomings of this process has been the absence of any provision for continuously feeding dough to the sheeting and coiling apparatus mechanically or without manual handling of the dough between the mixing apparatus and the sheeting apparatus. It has heretofore been necessary therefore to manually connect and knead together somewhat the ends of adjoining masses of dough to provide a continuous feed, and this has meant not only extra labor but irregularities in the width and thickness of the dough strip which causes irregularities in the weights of the cinnamon buns.

The present invention, which is inclusive of method and means, provides new and useful expedients for receiving the dough directly from the dough mixing machinery and forming the dough continuously into an elongated mass of indeterminate length to be continuously fed to the sheeting mechanism, by simple and novel expedients without manual handling of the dough and while insuring a more uniform character therefor.

In an important aspect the invention contemplates improved means incorporated directly with the continuous feed for proofing the dough and for guiding the dough intermediately to the proofer and from the proofer to the final sheeting and coiling mechanism.

The invention will be readily understood by reference to the following specifications, taken together with the accompanying drawings, setting forth an illustrative practice thereof, and in which drawings—

Figure 1 is a side elevational view of apparatus embodying one form of means for practicing the present invention;

Figure 2 is a plan view of the apparatus of Figure 1, but omitting parts for clearness of description;

Figure 3 is a somewhat enlarged view of the initial end of the apparatus as shown in Figure 1, but also indicating the dough;

Figure 4 is a sectional view of apparatus parts shown in Figures 1, 2 and 3, on the scale of Figure 3, and looking from the right to left of Figure 3;

Figure 5 is a continuation, on a somewhat larger scale of the apparatus shown in Figure 1, toward the right, but also indicating the dough;

Figure 6 is an enlarged plan view of parts shown near the left-hand end of Figures 1 and 2, and indicating the dough also; and Figure 7 is a partial plan view of elements shown in Figure 5.

Referring to the present illustrative embodiment, the numeral 11 indicates in general a dough divider which is in part conventional in that it may have as shown in Figure 4 a motor 12 which by belt 13 drives a pulley 14 which by belt 15 drives a pulley 16 on a countershaft 17. The countershaft 17 by a belt 18 drives a pulley 19 keyed to a cam shaft 20 upon which an eccentric 21 acts as a crank to drive through an eccentric strap 21a a pair of bell crank levers 22 and 23. The bell crank lever 22 through the medium of a rod 25 actuates a cutter plate 26. Dough from the mixer (not shown) may be received by gravity through the chute 27 and this chute, which may come through the ceiling of the room where the divider 11 is located, may be constantly full of dough which has been deposited therein by batches delivered thereto from the dough mixer which is customarily in the room above. By means of a gate 28, the operator may thus keep the dough divider hopper 29 full of dough fresh from the mixer, the dough falling by gravity from the chute 27 into the hopper 29 when the gate 28 is opened say in part as indicated at 30.

The divider hopper 29 being commonly full of dough when the apparatus is in operation, and the cut-off plate 26 being retracted by the bell crank lever 22 as shown in Figure 4, the dough falls into and fills up the ram pocket 31. When this is filled with dough the cutter plate 26 moves forward and cuts off the dough from the hopper 29. At this time the ram 32 is retracted by the bell crank lever 23 through the medium of the rod 33. At this time also, the division box 34 is depressed by actuation of the vibrating lever 24.

The vibrating lever 24 is actuated by an eccentric 24a on the cam shaft 20 through an eccentric strap 24b, the vibrating lever 24 being floatingly held at its lower end by a lost motion anchorage 24c and at its upper end being articulated at 24d with the bell crank lever 35 which is pivoted at 36 and by link 37 is articulated with the division box 34. In the depressed position of the division box, the wall 38 of the division box is in position closing the pocket 31.

As the mechanism described continues to operate, the division box 34 rises until the piston pocket 39 of the division box 34 is aligned horizontally with the ram pocket 31. Thereupon, the bell crank 23 actuates the ram 32 to force the dough from the ram pocket 31 into the piston pocket 39. At its outer end the piston pocket 39 is closed by piston 40 controlled by a piston rod 41, the position of which may be regulated as at 42 to vary the limits of movement of the piston in the piston pocket 39. When the ram 32 has moved to the limit of its movement to the left, the division box 34 begins to descend, cutting off or dividing the predetermined amount of dough which is now contained in the piston pocket 39. By means of the adjustment 42 this amount of dough may be varied for a given run. The piston rod 41 is actuated by rod 43 articulated with bell crank lever 44 pivoted at 45, on the division box 34, and the rod 43 is controlled by an eccentric 46 on the countershaft 17 and eccentric strap 46a, which by means of bell crank lever 44 operates so that when in the cycle of operation the division box 34 reaches the lower limit of its movement, the piston 40 is moved inwardly, by the mechanism described, and the dough of predetermined volume in the piston pocket 39 is ejected through the opening 47 at the right-hand end of the piston pocket 39, onto the upper run of the conveyor belt 48, which as seen in Figures 1, 2 and 3 is moving to the right in those figures.

In the conventional divider, which has been thus far described and to which in itself the present invention is not directed, there are a number, say five, of the piston pockets 39, each of which contains, as thus divided or scaled, just sufficient dough for say a pound loaf of bread, or commonly 17½ ounces of dough. Consequently, there are also five of the pistons 40 and their piston rods 41. In accordance with the present invention, however, the partitions heretofore located between the separate pockets 39 are removed, making this all one pocket and the divider mechanism thus divides and ejects therefrom an elongated mass of dough indicated at 49 (Figs. 2 and 3), which may be thus scaled to weigh say five times 17½ ounces or 87½ ounces or about 5½ pounds. Such mass would be about twenty inches long.

In the conventional divider also, the conveyor 48 is run at a speed coordinated with the speed of the divider such that each length or row of five dough pieces ejected from the divider is moved completely out from under the piston pockets 39 before the next row drops therefrom onto the belt. But, in accordance with the present invention, the belt 48 is slowed down somewhat so that, as each elongated dough mass 49 drops onto and travels a distance equal to a portion of its length on the belt 48, the end of the next oncoming mass 49 falls onto and overlaps slightly the trailing end of the mass 49 just ahead, as indicated at 50 (Fig. 3). At this time the dough is rather sticky. Thus a continuous elongated mass of dough or file is formed which travels from the belt 48 onto the upper run of the next conveyor belt 51.

In the conventional divider again, where it is desired to space apart the pieces of dough coming from the divider, the successive belts move faster. But, in accordance with the present invention, on the contrary, the belts 48 and 51 move at the same speed so as to maintain the continuous mass of dough without a break.

While the dough mass is thus continuous, there are joints at 50 which it is desirable to have kneaded somewhat to enhance the homogeneous continuity of the dough mass, and, for this purpose, as well as to minimize the joints 50 and render the continuous dough mass 49 uniform in cross-section, the elongated dough mass in accordance with the present invention, is led to and against the oblique curling and working or kneading roller 52 which overlies the conveyor 51. It will be understood that the conveyor 51 passes over a table platform 53 to support the belt. The curling and working or kneading roller 52 may be rotated as by a sprocket 54 keyed to its shaft and driven by a chain 55 from any suitable source, the direction of rotation of the curling and kneading roller 52 being as indicated by the arrow 56 (Fig. 6) such that the roller where it contacts the dough is moving in a direction somewhat opposed to the movement of the conveyor belt 51, and so as to twist and turn the dough upon itself somewhat spirally, as indicated by the arrow 57 (Fig. 6), thus working the dough together, minimizing the joints 50, and equalizing the dough cross-section.

As the dough moves off and away from the end of the curling and kneading roller 52, it has now been moved obliquely laterally on the belt 51, and working or the rotation of the dough ceases as it leaves the curling and working or kneading roller 52. Just ahead of the curling and kneading roller 52, and before the dough contacts it, a flour dusting box 58 equipped with the usual shaker mechanism dusts flour onto the dough passing thereunder and onto the conveyor belt 51, which flour is worked into the surface of the dough by the curling and working or kneading roller 52, thus advantageously forming a skin on the dough which it lacks immediately as it is ejected from the divider and which skin is desirable to permit proofing or raising of the dough without the loss of the dough gases and moisture which contribute to the texture and flavor of the baked product. This smooth non-sticky skin on the dough also permits travel of the dough on the belts preparatory to further treatment, without sticking on the belts. The dough mass also tends here to widen somewhat.

Further in accordance with the present invention, as the long continuous dough mass, which may now be given the numeral 59, moves to the right on the conveyor belt 51, it is picked up by the closely adjacent vertical conveyor belts 60 and 61, the adjacent runs of which both move upwardly at the same speed and which thus convey between them the continuous long dough mass 59 up into the upper run 62 of a series of proofer belts indicated generally by the numeral 66, and which may be conveniently slung from the ceiling of the room in which the operations are carried on. The continuous dough mass 59 may thus pass continuously back and forth on the runs 62, 63, 64 and 65 of the proofer 66, each belt running in the opposite direction to the belt next to it. The ends of the belts 62, 63, 64 and 65 are staggered so that the dough may fall from one belt to the belt next below it and then move in the opposite direction. Since the dough mass gains volume as it proofs or raises, the belts 62-65 are arranged to run each at successively faster speeds so as to prevent buckling or folding of the dough.

Just below the belt 65 is a hinged belt section 67 traveling in the opposite direction to the belt 65 and which receives the continuous dough mass 59 from the belt 65 and directs the dough toward a belt 68. When the dough reaches the belt 68, it has now been suitably proofed for sheeting, as next described, this final sheeting and treatment of the dough being done desirably in accordance with the Fonken and Cohen et al. patents already referred to and not in itself forming a part of the present invention. In accordance with the present invention, the hinged conveyor section 67, which may be hinged as at 69, may be elevated toward the ceiling when the mechanism or apparatus described is not in use and to be thus out of the way.

Turning now to the final sheeting, coiling, and cutting of the dough, which, while not in itself forming the gist of the present invention, is here described to illustrate one highly important utility for the present invention, the continuous long dough mass 59, as best seen in Figure 5, is directed by the conveyor belt 68 to the plurality of pairs of sheeter rollers 70 and 71 by which the dough mass 59 is sheeted to a long continuous flat strip 72, of substantially uniform width and thickness. Thereupon, the dough strip 72 travels onto the conveyor belt 73 the upper run of which travels over a table top 73a. Here, to make cinnamon buns for example, the dough strip receives an oil, deposited by the oil delivery pipe 74, which is worked into the dough somewhat by the idler roller 75, and thereupon the dough strip passes beneath the cinnamon trough 76 equipped with the usual shaker dusting mechanism for depositing powdered or granulated cinnamon onto the dough strip. Next, the dough strip 72 engages oblique roller 77 which is rotating in the direction of the arrow 78 (Fig. 7) and coils the dough upon itself while moving it laterally on the conveyor 73 as indicated at 79. The dough comes off the coiling roller 77 in the form of a coiled cylinder 80, each given longitudinal extent of which is substantially uniform in cross-section and thus in volume and weight.

Finally, the continuous coiled dough cylinder 80 may be cut as by a revolving knife 81 of the squirrel-cage type into short sections 82 which may be turned up on end and placed in pans to bake for cinnamon buns. By the present invention, it is assured that each bun will contain the same amount of dough and therefore will weigh substantially exactly the same.

Manifestly, the invention is not limited to the details of structure or the precise sequence of steps referred to. Furthermore, it is to be understood that it may not be essential for the utilization of basic concepts of the invention that all features herein set forth be at all times used conjointly, since various combinations or subcombinations might at times be advantageously employed.

Such changes may be made in structure and steps of procedure as fall within the scope of the appended claims without departing from the invention. For example, in the making of bread the cut cylinders 82 might be longer and the oil and cinnamon omitted.

The invention having been described, what is here claimed is:

1. The method of continuously feeding and sheeting dough which is characterized by the steps of forming relatively short lengths of elongated masses of dough, arranging them end to end in file on a conveyor, mutually contacting adjacent ends of the masses, continuously turning the dough somewhat laterally upon itself on said conveyor to work said ends together while causing the file to move generally longitudinally on the conveyor, whereby to produce a continuous elongated dough mass, and only subsequently sheeting the dough to provide a continuous flat strip of dough of substantially uniform width and thickness.

2. In means for continuously feeding and sheeting dough, for use with means for forming a plurality of relatively short lengths of elongated unsheeted masses of dough, in combination, table means, endless belt conveyor means on said table means, said conveyor means being arranged for receiving by gravity said unsheeted masses as initially formed by the forming means and being arranged to run at a speed relative to said forming means whereby the successive masses are deposited on said table means end to end in file with their adjacent ends overlapping, and a rotating oblique turn-up roller disposed over said table means in the path of said dough on said conveyor means for continuously turning the dough upon itself to work said ends together while causing the dough to move obliquely on the conveyor means past the discharge end of said roller, whereby to produce a continuous elongated mass of dough adapted to be subsequently sheeted to provide a flat strip of dough of substantially uniform width and thickness.

MORRIS COHEN.

REFERENCES CITED

The following references are of record in the file of this patent:

UNITED STATES PATENTS

| Number | Name | Date |
| --- | --- | --- |
| Re. 22,399 | Fonken | Dec. 7, 1943 |
| Re. 22,875 | Grimm et al. | May 6, 1947 |
| 698,814 | Chase et al. | Apr. 29, 1902 |
| 2,337,539 | Buechek | Dec. 28, 1943 |
| 2,352,617 | Cohen et al. | July 4, 1944 |
| 2,390,195 | Tascher | Dec. 4, 1945 |